OSCILLATOR

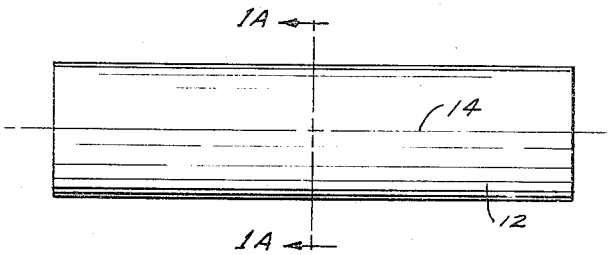
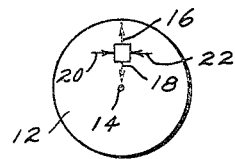
Fig. 1
Fig. 1A
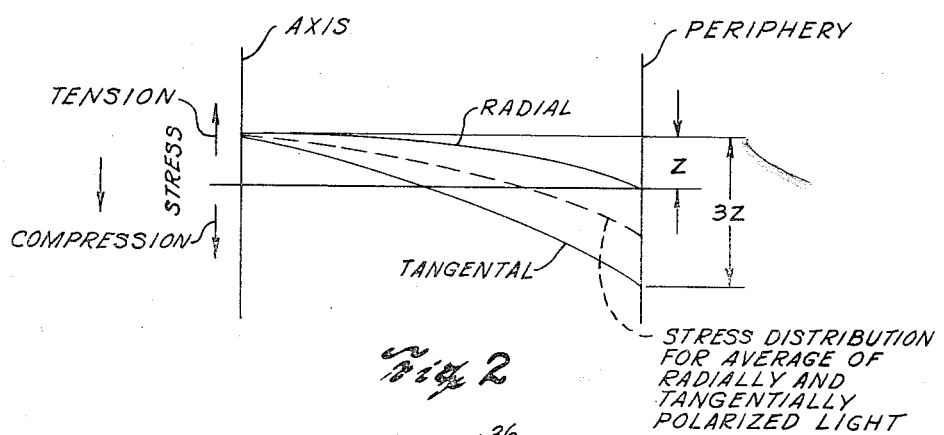
Fig. 2
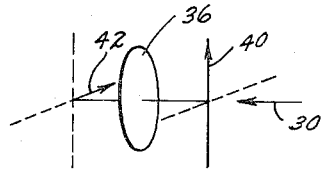
Fig. 3A
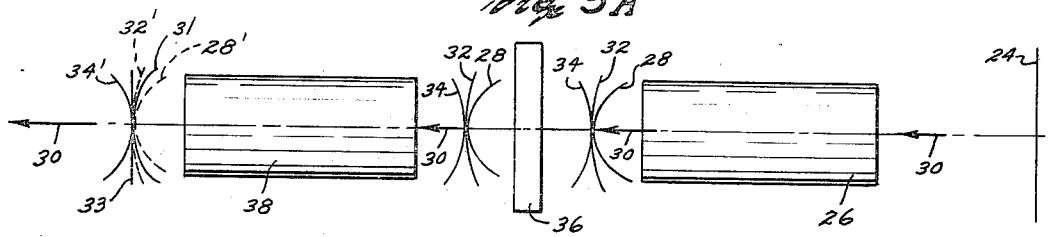
Fig. 3

AMPLIFIER

MULTIPLE-STAGE AMPLIFIER

INVENTORS
CHARLES J. KOESTER
ELIAS SNITZER
BY
ATTORNEY

United States Patent Office
3,484,714
Patented Dec. 16, 1969

3,484,714
LASER HAVING A 90° POLARIZATION ROTATOR BETWEEN TWO RODS TO COMPENSATE FOR THE EFFECTS OF THERMAL GRADIENTS
Charles J. Koester, South Woodstock, Conn., and Elias Snitzer, Sturbridge, Mass., assignors, by mesne assignments, to American Optical Corporation, a corporation of Delaware
Filed Dec. 16, 1964, Ser. No. 418,775
Int. Cl. H01s 3/10
U.S. Cl. 331—94.5                                   8 Claims

ABSTRACT OF THE DISCLOSURE

A pair of laser rods having a 90° rotator therebetween to compensate for the effects of stress birefringence in the laser rods.

---

This invention relates to laser apparatus and more particularly to laser apparatus and devices associated therewith to enable the elimination of the effects of thermal gradients and stress birefringence.

Lasers, otherwise referred to as optical masers, are light-amplifying or light-producing devices and are specifically adapted to provide an output of high-intensity, coherent, monochromatic light. Such light is produced in a laser (an acronym for light amplification by simulated emission of radiation) by photonic emission from the active atoms of a body or core composed of a so-called laser material. These atoms, which are in a "positive temperature" state absorb a quantum of light from a flash lamp, said light being at a frequency proportional to the difference in energy between two of the energy levels of the atom. The atoms are, therefore, "pumped" or excited to a high energy level and a "negative temperature" state of population inversion, from which they rapidly relax to a more stable intermediate level (still above the original level). The atoms then relax, at a somewhat slower rate, from this intermediate level to the original level with an attendant emission of light. This emission by the spontaneous relaxation to the original level is fluorescence, which stimulates a further relaxation of atoms still at the intermediate level and the desired laser output is obtained. The laser output is coherent since it moves in phase with the stimulating fluorescent light given off from the spontaneous emission, and intensity in a narrow cone is provided by the structure of a laser, which is in the form of a rod, one end of which is totally reflective and the other end of which is slightly transmissive. The only light which is strongly amplified is that which moves in the same direction as the fluorescent light (perpendicular to the ends) and, therefore, the output has almost all of its intensity in a narrow cone.

By way of example, one conventional form of laser structure includes a rod-shaped body composed of a suitable solid laser host material containing a quantity of activator material, said body being surrounded concentrically by a helical gaseous-discharge flash tube adapted to emit a pulse of light specifically including light in the wavelength of an absorption band of the laser material. When the flash tube is actuated, this light pulse enters the laser body, is absorbed by the laser material, and thereby pumps the body with energy of such absorptive wavelength. This pumping excites active atoms in the laser body to shift from an initial low energy level, in a series of interlevel transitions typically involving a first energy-absorptive transition, to a short-lived high energy level and an immediately subsequent spontaneous non-radiative transition (with release of heat energy but presently regarded as non-emissive) from this unstable level to the somewhat more stable upper energy level referred to above (intermediate in energy between the aforementioned initial and unstable levels), and from which light-emissive transition occurs. Thus, the pumping pulse provides the excitation step in laser operation, creating a very large population of atoms at the upper energy level in the laser body. The establishment of this large upper lever population is referred to as an inversion of energy states of the body.

For effecting induced light-emissive transition from this level to complete the atomic cycle of laser operation, the laser body of the structure is disposed coaxially within a resonant cavity between opposed reflective cavity ends. Immediately upon the inversion of energy states of the body, individual atoms at the aforementioned upper energy level begin to undergo emissive transition, spontaneously shifting to a lower energy level or terminal level (which may or may not be the initial, lowest energy level, i.e. the ground state, depending on the nature of the laser material used) with concomitant emission of light. Since this upper energy level is relatively stable in a laser material, such spontaneous emission would deplete the enlarged upper level population at a comparatively slow rate. However, a portion of the light emitted by the spontaneously emitting atoms passes through the resonant cavity to the ends thereof and is thence reflected back-and-forth through the cavity between the reflective cavity ends, passing and repassing in multiple bidirectional reflections. This bidirectionally reflected light immediately excites other atoms at the upper energy level to induce them to undergo emissive transition to the terminal level, producing more light, which augments the bidirectionally reflected light in the cavity to induce still further emissive transitions from the upper level population. In such fashion a rising pulse of bidirectionally reflected light quickly develops within the cavity, reaching a quantitatively large value as the induced emissive transition of atoms from the upper level population becomes massive. Light of high intensity is accordingly created in one or a succession of light pulses while the pumping light is present, the action continuing until depletion of this population by such transitions restores the laser body to a normal energy distribution. To permit emission of such portion of this large bidirectionally reflected light pulse or pulses from the laser cavity, one reflective end of the cavity is made partially transmissive. The fraction of the bidirectionally reflected light escaping therethrough constitutes the laser output pulse.

Also, it should be understood that stimulated light-emissive transition from the intermediate level to the lower level in a laser amplifier is accomplished without the use of a resonant cavity (without reflective cavity ends) by using a separate laser source for that purpose, the separate laser source being the origin of the light to be amplified.

It has been found that the intensity of the useful portion of the laser output pulse can be enhanced by restricting the bidirectional reflection of light in the laser oscillator cavity and the light to be amplified in a laser amplifier rod to light emitted in certain selected modes of propagation. The atoms in a laser body emit light in a plurality of such modes, including the modes for the plane waves propagated parallel to the long axis of the body, hereinafter designated the axial plane wave modes, and modes for waves directed at angles to the axis, hereinafter referred to as off-axis modes. In particular, if the only light allowed to reflect bidirectionally or propagate through the rod were light emitted in the axial plane wave modes, so as to effect stimulation of emission predominantly by mode-selected plane wave light energy, a high degree of emissive efficiency would be achieved. The laser output of light in the plane wave front (the useful portion of the output pulse) would be significantly greater than it is when bidirectional reflection of light in off-axis modes is allowed to develop in the cavity; the beam spread angle of the output pulse would be reduced, and as a result the output intensity, or power per unit solid angle delivered by the laser at any given distance (an inverse function of the beam spread angle), would be advantageously increased. These same mode-selective considerations are useful with laser amplifiers as well as oscillators.

The flash tube, as it is called, for "pumping" or providing the initial energy inversion, may be in the form of a helix concentrically surrounding and in spatial relationship to the laser rod, with coils that are equally spaced along the length of the laser rod to distribute its heat emission evenly along the length of the rod. However, it may be seen that the radial heat distribution is quite uneven, the flash tube causing higher temperatures at the periphery of the rod and lower temperatures at its axis. The thermal stress distribution in the rod is, therefore, similarly uneven, causing a change in index of refraction during "pumping" by the flash tube and a resulting reduction in beam definition, which is intimately related to a desired laser output. Also, the same type of temperature variations are produced with other flash tubes such as those in cylindrical form with the cylinder axis parallel and spatially related to the laser rod.

Furthermore, stress birefringence is caused throughout the laser rod by uneven temperature, so that light polarized tangentially will encounter a different index of refraction than light polarized radially at all points not on the axis. The total result of the varying indices of refraction is a difference in path length with distance from the axis, and with polarization, and a consequent reduction in beam definition.

At the present time, the laser art is proceeding without compensation for these problems. Lens compensation is impractical, especially for the stress birefringence, since a fixed lens becomes useless in the face of a constantly changing variation in the indices of refraction; and, obviously, a series of insertable lenses are also unsatisfactory.

Accordingly, a primary object of the present invention is to compensate for the effects of thermal gradients and stress birefringence produced in a laser rod by the heat from the flash tube.

A more specific object is to select axial modes of propagation and average the radial and tangential vectors of the propagated light to alleviate the harmful effects of thermal gradients and stress birefringence.

These and other objects are accomplished in one illustrative embodiment of the invention, which features a passive ninety degree rotator for rotating polarization vectors and thereby averaging the path length of tangentially and radially polarized light waves being propagated by an even number of laser rods, half of which are disposed on one side of the rotator and half of which are disposed on the other side of the rotator.

Other objects, features, embodiments and modifications are contemplated and will be described and become apparent from the following more detailed discussion and by reference to the accompanying drawings, wherein:

FIG. 1 is a representation of a typical laser rod;

FIG. 1A is a sectional diagrammatic representation of the compression and tension on an isolated portion of a plane of the laser rod of FIG. 1, the section being taken perpendicular to the axis;

FIG. 2 is a plot of the stress distributions for the tangential and radial directions of polarization;

FIG. 3 is a representation of the laser rod of FIG. 1 shown with the equiphase surfaces or wave fronts, depicting also the variation in index of refraction due to temperature, radial stresses, and tangential stresses and the average variation of the index of refraction for tangential and radial stresses attained by the apparatus of the invention;

FIG. 3A is a representation of the rotation of polarization vectors by the rotator of FIG. 3;

Figure 4:
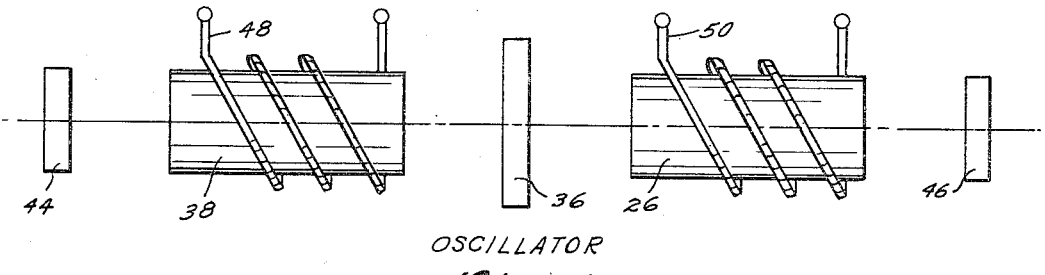
FIG. 4 is a schematic representation of a laser oscillator arrangement according to the present invention.

Referring first to FIG. 1, there is shown a representation of a typical laser rod 14, the drawing being a side view of a substantially cylindrical configuration. FIG. 1A is a sectional diagrammatic representation of the compression and tension of an isolated portion of a plane of the laser medium perpendicular to the axis 14 of the laser rod of FIG. 1. Light propagates in the direction of axis 14 of the laser rod with the stresses being caused by the variation in temperature of the rod, which are, in turn, caused by the non-uniform distribution of heat from the flash tube as described in the introduction to this specification. The radial stresses 16 and 18 are tension stresses, whether or not the laser rod is analyzed at its center or at its periphery, as shown by the plot of FIG. 2. Tangential stresses 20 and 22 are compressive near the periphery of the laser rod and in tension near the axis or center of the rod, as shown by the plot of FIG. 2. Relating the aforementioned stresses to indices of refraction, it is known that a medium under tension has a lesser index of refraction than a medium under compression, so that the index of refraction $n$ will vary approximately according to the plot for stresses shown in FIG. 2.

Referring next to FIG. 3, the approximate variations of the wave fronts (related to the variations of the indices of refraction $n$) are shown as light emerges from the end of a laser rod 26. An entering plane wave 24, an optically perfect laser rod 26 and a matching rod 38 are assumed, so that with tangentially polarized light, the variation 28 of the wave front due to stresses is shown for the direction of propagation 30. Since the index of refraction is less and consequently the phase velocity is greater at the axis of the rod than at its periphery, the equiphase surface of wave front 28 for tangential polarization will be convex, protruding in the direction of propagation near the axis of the rod. On the other hand, the variation 32 of the wave front due to stress for radially polarized light is less protruded at the center of the rod, even though for such polarization, the index of refraction is still less at the center than at the periphery of the rod. The difference in convexity between variations 28 and 32 is best illustrated by reference to FIG. 2, where the index of refraction $n$ increases downwardly for radial polarization in that plot and for tangential polarization increases downwardly approximately three times as much as for radial polarization, with the axis of the laser rod as a reference. In other words, the index of refraction increases towards the periphery of the rod by a representative amount $z$ for radial polarization, whereas for tangential polarization the index of refraction increases by a representative amount $3z$.

FIG. 3 also depicts variation 34 of the wave front due to temperature. Since temperature is greatest at the laser rod periphery due to the proximity of the flash tube, it is assumed that the higher index of refraction will be at the axis of the rod, since heat has a lessening effect on the index of refraction by dispersing the molecules of the laser medium more as temperature is increased. The previous statement is made with the understanding that index of refraction can also increase with temperature, depending on the composition of the glass, but a choice of glass composition may be made so that the index of refraction varies inversely with temperature in the manner assumed. The curvature of the wave front resulting from the variation of index of refraction 34 due to temperature will, therefore, be in the opposite direction from its variations 28 and 32 caused by stresses, if the direction of propagation is assumed to be that shown by arrow 30.

With the stress distributions and variations in index of refraction as shown by FIG. 2 and as thus described with reference to FIG. 3, the apparatus according to the present invention is designed to provide a plane polarized output of the laser rod with a uniform intensity (flat wave front) at the output aperture. Means are provided whereby, if light propagates through a medium having a variation in the index of refraction such as to produce wave fronts represented by the curves 28, 32 and 34, it is then propagated through a rotator 36 for ninety-degree rotation of its polarization vectors and then through a second laser rod 38, where it undergoes the same variations as those encountered during propagation through rod 26.

By way of example, the tangentially polarized light (radially polarized when propagating through rod 26) will encounter a variation 28' when propagating through the rod 38. The radially polarized light (tangentially polarized when propagating through rod 26) will encounter a variation 32' in index of refraction when propagating through the rod 38 and the variation 34' due to index of refraction will be the same as that for rod 26 due to propagation through the rod 38. As a result, the emerging wave fronts, representing variations in index of refraction will be as shown by curves 31 and 34 at the output end of the rod 38. The variation 31 is a result of the averaging of variations 28' and 32' by ninety degrees rotation of polarization vectors. The averaging is accomplished by causing the laser light to undergo the stress birefringence effects of both laser rods; the light encounters a first variation for its radially polarized vectors and a second variation for its tangentially polarized vectors during propagation through the first rod, and the first variation for its tangentially polarized vectors and the second variation for its radially polarized vectors during propagation through the second rod. The average variation 31 due to compressive and tensive stresses and the variation 34 due to thermal stresses are equal and opposite and, therefore, produce a flat wave front 33 which is the desired output of the laser system.

If a suitable glass composition for adjusting index of refraction variation 34 due to thermal stresses to be equal and opposite to equiphase surface 31 is unavailable for any reason, or, if available, does not have the desired laser characteristics, a lens of appropriate curvature is used to correct equiphase surface 34 in order to obtain an approximately flat wave front output by making it equal and opposite to wave front 31. For instance, if it is necessary to slightly flatten surface 34, a negative lens is used for retarding the laser output progressively toward the periphery. The focusing tendency of surface 34 is then counteracted slightly to make it equal and opposite to surface 31.

FIG. 3A shows more clearly the rotation of vector 40 upon being propagated in direction 30 through rotator 36. The emerging vector 42 is shown to be rotated by ninety degrees according to the aforementioned description.

The rotator 36 used in the present invention is a so-called "passive" rotator, such as a section of quartz crystal cut perpendicular to the optic axis or a liquid cell of sugar solution or turpentine. As an example, if quartz is used, the rotator plate is approximately 4.2 millimeters thick when the laser output is 1.06 microns (neodymium) or approximately 5.92 millimeters thick when the laser output is 694 millimicrons (ruby). Also, the rotator may comprise a pair of half-wave plates (half-wave for the wavelength characteristic of the laser used) with an angle of forty-five degrees between their fast axes, using materials such as quartz cut parallel to the optic axis, mica, calcite, etc. Furthermore, a Faraday rotator is also useful where expense and the inconvenience of having a readily available magnetic system is not an important consideration.

A laser oscillator system is shown in FIG. 4 as comprising a pair of matched laser rods 26 and 38 with rotator 36 therebetween and reflectors 44 and 46 at the extremities of the system for forming a resonant cavity. A common flash tube or matched flash tubes 48 and 50 are used to pump the laser rods 38 and 26, respectively.

Figure 5:
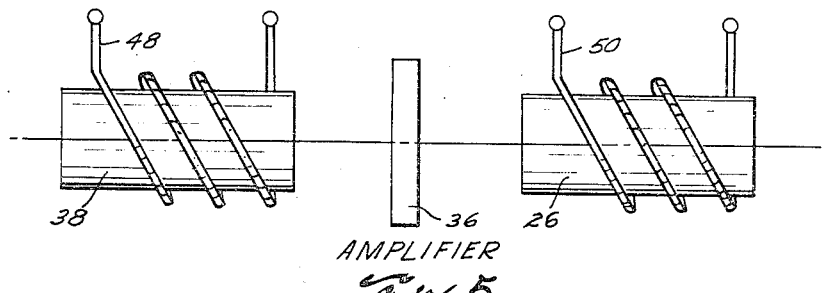
FIG. 5 is a schematic representation of a laser amplifier arrangement according to the present invention.
Figure 6:
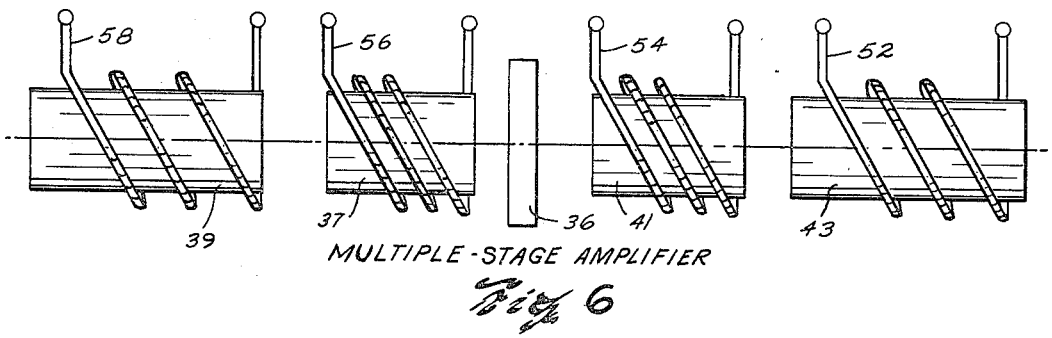
FIG. 6 is a laser multiple-stage arrangement according to the present invention.

A laser amplifier system is depicted in FIG. 5 as the duplicate of the system of FIG. 4 without reflectors 44 and 46 and FIG. 6 is an extension of the apparatus of FIG. 5 using more than one matched laser rod. In the latter figure, matched rods 37 and 41 are pumped by a common flash tube or, as shown in the drawing, by matched flash tubes 56 and 54, respectively, the pair of rods straddling a rotator 36. The multiple-stage amplifier also comprises matched rods 39 and 43 with a common flash tube, or, as shown in the drawing, matched flash tubes 58 and 52, respectively.

In all embodiments of the invention, it is contemplated that the laser light may be propagated in substantially axial modes, only, in order to enhance the light output as was described in the introduction to this specification. Such axial mode propagation is accomplished by apparatus such as that disclosed in U.S. Patent No. 3,421,097, filed Mar. 25, 1963, for Improvements in Laser Amplifier by C. J. Koester and E. Snitzer and similarly assigned to American Optical Company.

We claim:
1. In combination with a laser apparatus including a single optical resonant cavity having a pair of laser rods positioned within said cavity, each laser rod having an active laser ingredient therein for propagating light in a number of modes, compensating means for the effects of thermal gradients in said rods, comprising:
    an optically active rotator means between said rods for averaging the radial and tangential vectors of said modes by providing a total angular displacement of substantially 90° in the polarization of laser energy as it passes between said laser rods.
2. The invention according to claim 1 wherein said rotator means comprises a crystalline quartz plate cut perpendicular to the optic axis.
3. The invention according to claim 1 wherein said rotator means comprises a pair of half-wave plates with an angle of 45° between their fast axes.
4. The invention according to claim 3 wherein said half-wave plates are of crystalline quartz cut parallel to the optic axis.
5. In combination with a laser apparatus including an optical resonant cavity having a pair of laser rods positioned within said cavity, each laser rod having an active laser ingredient therein for propagating light in a number of modes, compensating means for the radial variation of index of refraction due to compressive, tensive, and thermal stresses caused by thermal gradients in said rods, comprising:
    an optically active rotator means along an axis between said rods and within the reflectors which define said cavity for averaging the radial and tangential vectors of said modes to eliminate said variations due to compressive and tensive stresses by rotating the polarization of the output of one of said laser rods substantially 90° before it enters the other of said laser rods; said rotator means comprising a quartz plate cut perpendicular to the optical axis.
6. In combination with a laser apparatus, means for compensating for the variation of index of refraction due to compressive, tensive, and thermal stresses caused by thermal gradients, comprising:
    first and second matched laser rods positioned within a single optical resonant cavity having an output end for the pair on said second rod;
    an optically active 90° rotator means for causing the laser light propagated through said rods to encounter a first variation for its radially polarized vectors and a second variation for its tangentially polarized vectors during propagation through said first rod, and the said first variation for its tangentially polarized vectors and the said second variation for its radially polarized vectors during propagation through the second rod.

7. In combination with a laser apparatus, means for compensating for the variation of index of refraction due to compressive and tensive stresses caused by thermal gradients, comprising:

first and second matched laser rods positioned within a single optical resonant cavity having an output end for the pair on said second rod; and, an optically active 90° rotator means for causing the laser light propagated through said rods to encounter a first variation for its radially polarized vectors and a second variation for its tangentially polarized vectors during propagation through said first rod, and the said first variation for its tangentially polarized vectors and the said second variation for its radially polarized vectors during propagation through the second rod.

8. In combination with a laser apparatus including a single laser amplifier, said single laser amplifier comprising a pair of matched laser rods with an optically active rotator positioned therebetween, each of said rods having ends with essentially non-reflective surfaces, said rotator providing the means of compensating the effects of thermal gradients by providing a total angular displacement of substantially 90° in the polarization of laser energy as it passes between said laser rods.

References Cited

UNITED STATES PATENTS

| | | | |
|---|---|---|---|
| 3,312,905 | 4/1967 | Lewis | 331—94.5 |
| 3,281,712 | 10/1966 | Koester | 331—94.5 |
| 3,292,102 | 12/1966 | Byrwe | 331—94.5 |
| 3,373,376 | 3/1968 | Clark et al. | 331—94.5 |

OTHER REFERENCES

Crowe, J, Laser Amplifier Having Interstage Isolation, IBM Tech. Discl. Bull., vol. 6, #9, February 1964, p. 96.

JEWELL H. PEDERSEN, Primary Examiner

E. BAUER, Assistant Examiner

U.S. Cl. X.R.

330—4.3